AUTOMATIC PHONOGRAPH

Filed April 11, 1946 4 Sheets-Sheet 1

INVENTOR.
Carl G. Johnson
BY John L. Eakins
ATTORNEY

INVENTOR.
Carl G. Johnson
BY John F. Eakins
ATTORNEY

INVENTOR.
Carl G. Johnson
BY John F. Eakins
ATTORNEY

AUTOMATIC PHONOGRAPH

Filed April 11, 1946 4 Sheets-Sheet 4

INVENTOR.
Carl G. Johnson
BY John F. Eakins
ATTORNEY

Patented Nov. 4, 1952 2,616,704

UNITED STATES PATENT OFFICE 2,616,704

AUTOMATIC PHONOGRAPH

Carl G. Johnson, Chicago, Ill., assignor to J. P. Seeburg Corporation, Chicago, Ill., a corporation of Illinois Application April 11, 1946, Serial No. 661,299

4 Claims. (Cl. 274—10)

This invention relates to automatic phonographs and particularly to the type of record changing automatic phonographs in which a stack of records is supported above the turntable on a stepped post or spindle and on a lateral support, the lowermost record of the stack being discharged periodically so that it drops on to the turntable for reproduction.

In my co-pending application Serial No. 642,141 filed January 19, 1946, I have described and claimed a phonograph of this general type in which the lateral support is movable into three positions for cooperating with records of two different sizes and permit removal of played records or to permit manual operation of the phonograph. The spindle or post was adjustable so that in the two playing positions it provided a record supporting step on the opposite side of the spindle from the step and an opposed shoulder, the shoulder being spaced above the level of the step in such manner that only the lowermost record could be displaced into dropping position. The post was capable of adjustment into substantial continuity for ease in removing a stack of played records or for application of a single record manually on to the turntable and the manual removal of such a record. The lateral support was operatively connected to the post or spindle so that the post was stepped when the lateral support was set for playing records of either size and the post was rendered continuous or non-stepped when the lateral support was in the unloading or manual position. Means associated with the lateral support defined the initial playing position of the player arm for records of the size for which the lateral support was set. Means also associated with the lateral support provided an adjustment between the shoulder and step of the spindle so that the vertical space between the step and shoulder was greater when the lateral support was set for records of larger size than was the case when the lateral support was set for records of smaller size, the records of larger diameter having greater thickness than the records of smaller diameter.

One of the objects of the present invention is to provide an improved phonograph of this type.

A further object of the invention is to provide an improved spindle adapted to be adjusted into step providing position and into substantial continuity.

A further object of the invention is to provide an improved tone arm actuating means.

A further object of the invention is to provide improved means for actuating the spindle to provide variable spacing between its step and shoulder.

Other objects, advantages and capabilities of the invention will appear from the following description of a preferred embodiment thereof, taken in conjunction with the accompanying drawings, in which.

Figures 1, 2:
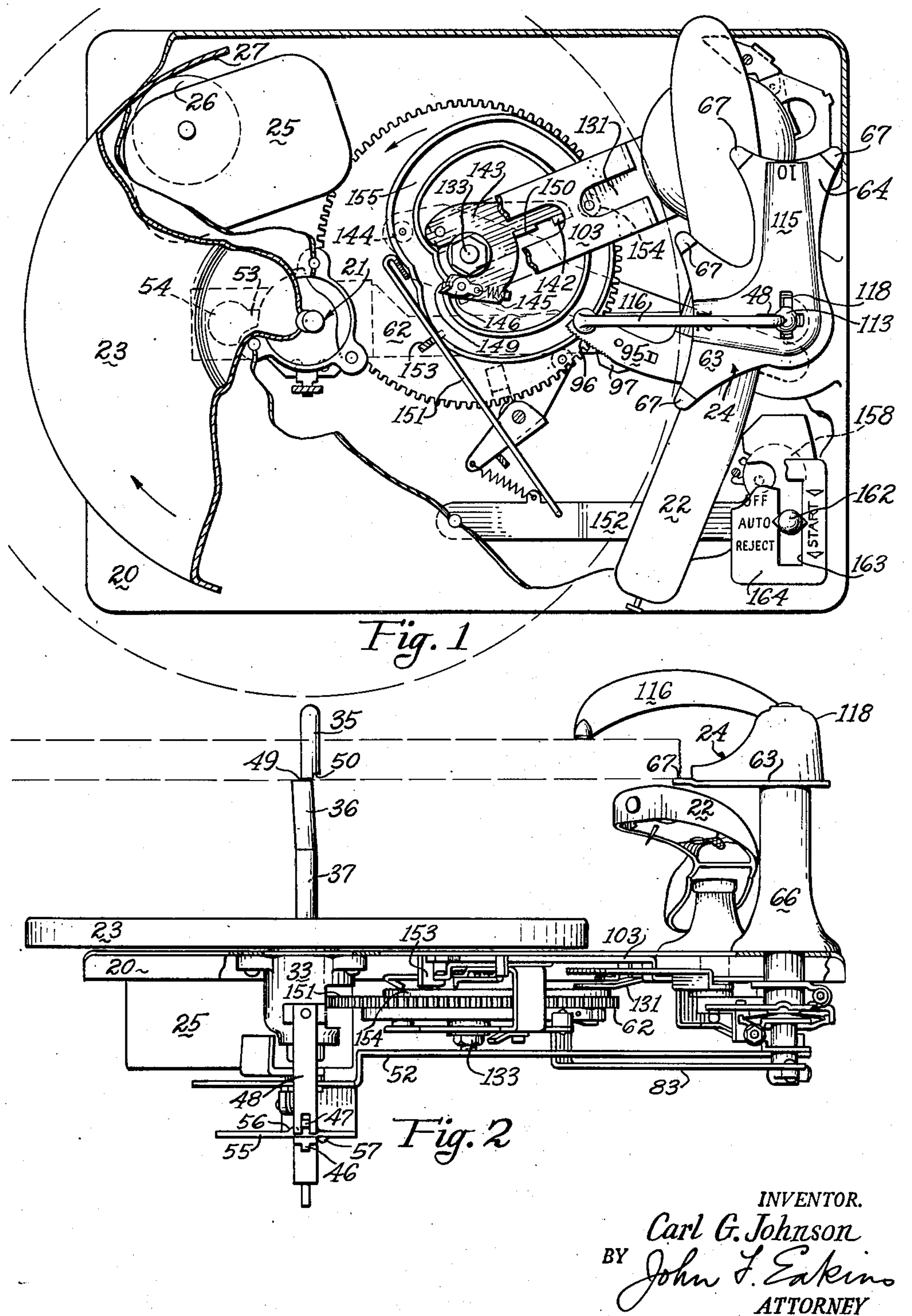
Figure 1 is a plan view of a phonograph embodying my invention, part of the turntable and motor board being broken away to disclose the mechanism.
Fig. 2 is an elevational view of the phonograph conditioned for the automatic playing of a stack of twelve-inch records, the records being shown in phantom.

Referring to the drawings, the phonograph comprises a motor board 20, a spindle 21, a player arm 22, a turntable 23 and a lateral record support 24. The phonograph is driven by a motor 25 which drives a rubber tired idler 26 engaging the depending flange 27 of the turntable 23. The turntable is provided with a central boss 28 which is provided with teeth 29 and nonrotatably engages a disc 30 which is provided with a plurality of down-turned projections 31. The disc 30 rests upon a ball race 32 which abuts against the lower end of a bracket 33 which depends from the motor board 20 around an opening 34 in the motor board.

The spindle 21 comprises an upper portion 35, an intermediate portion 36 and a lower portion 37 which is in the form of a sleeve. Its lower end is stepped and is seated in the lower end of the bracket 33, being secured thereto by a nut 38. The boss 28 of the turntable is provided with sleeve bushings 39 which engage the exterior of the sleeve 37.

Figures 3, 4, 5, 6:
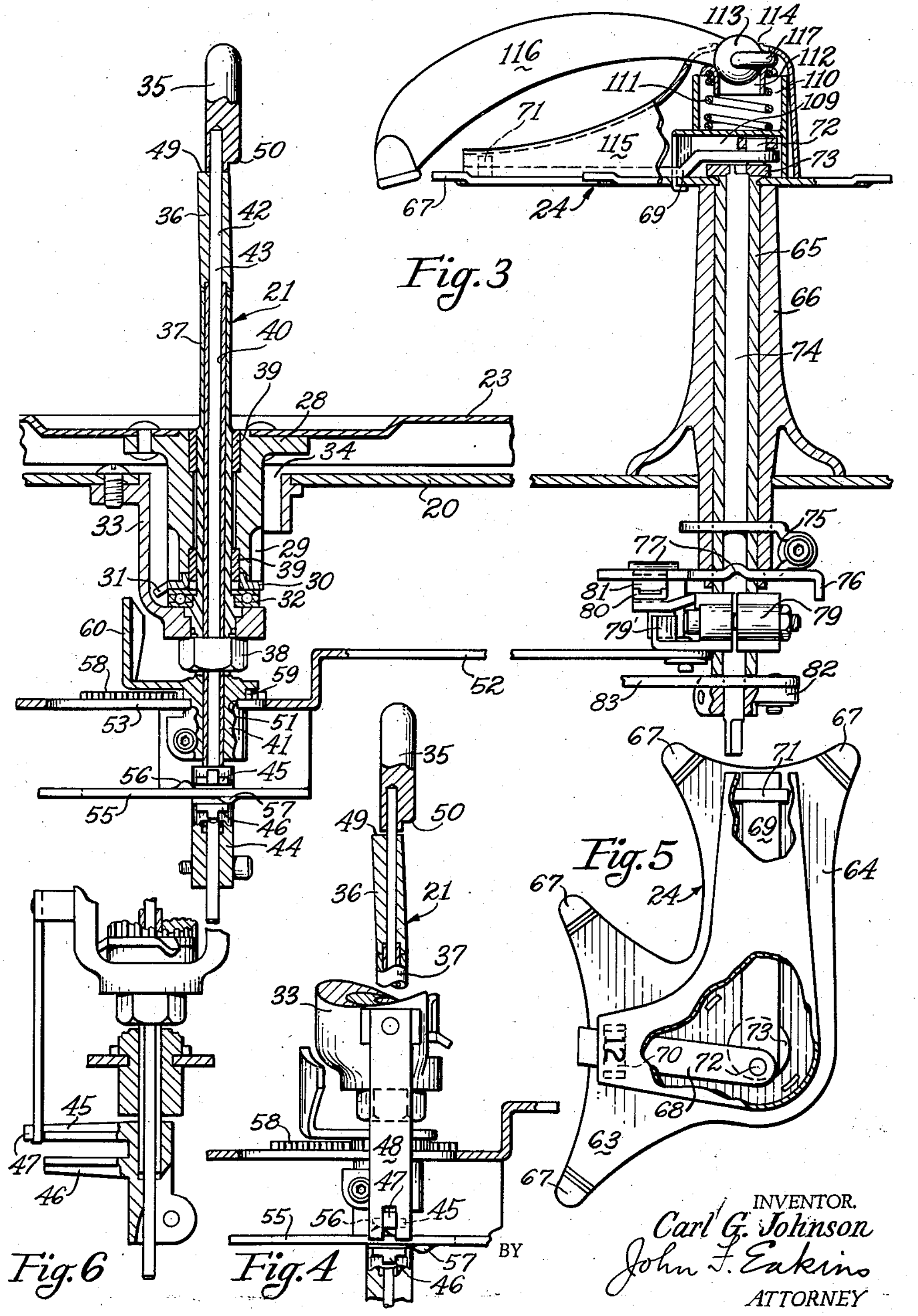
Fig. 3 is a fragmentary sectional elevational view showing the turntable spindle and lateral support conditioned for playing ten-inch records.
Fig. 4 is a fragmentary elevational view partly in section of the spindle and associated elements, the spindle being adapted for cooperation with records of larger size.
Fig. 5 is a plan view of the lateral support, partly broken away to disclose the mechanism.
Fig. 6 is a fragmentary elevationay view partly in section of elements associated with the spindle as viewed from the right in Fig. 4.

The intermediate portion 36 of the spindle 21 is secured at its lower end to a sleeve 40 which is rotatably mounted within the sleeve 37. The sleeve 40 extends below the nut 38 and at its lower end it has rigidly secured thereto a boss 41. The upper end of the boss engages the end of the sleeve 37 so that the intermediate portion 36 of the spindle 21 abuts against the upper end of the sleeve 37. The intermediate portion 36 is located at a slight angle to the vertical and it is provided with a vertical bore 42 which consequently makes a slight angle with the longitudinal direction of the portion 36. The upper and lower faces of the intermediate portion 36 are horizontal so that they make a similar slight angle to the transverse direction of the intermediate portion. The upper portion 35 of the spindle 21 is rigidly secured to a rod 43 which extends downwardly through the bore 42 and through the sleeve 40. At its lower end, which projects beyond the sleeve 40 the rod 43 rigidly carries a sleeve 44 which carries two radial parallel spaced arms 45 and 46. The upper arm 45 carries a projection 47 which extends into a vertical slot at the lower end of a bar 48 which rigidly depends from the bracket 33 so as to hold the rod 43 and the upper portion 35 of the spindle 21 against rotation. The sleeve 44 is mounted on the rod 43 so as to provide for a slight longitudinal movement of the rod 43 and the upper portion 35 of the spindle 21. The upper portion 35 of the spindle is preferably located out of alignment with the sleeve 37. The lower end of the intermediate portion 36 is always aligned, or in continuity with the sleeve 37. When the machine is in automatic operating condition the upper end of the intermediate portion 36 is out of alignment or out of continuity with the upper portion 35 so as to provide a record supporting step 49 as shown in Figs. 2, 3 and 4. Near its lower end the upper portion 35 of the spindle 21 is provided with a shoulder 50 which is located the thickness of a record of smaller size above the lower extremity of the portion 35. The lower extremity of the upper portion 35 below the shoulder 50 is conformed so that it lies within the circle defined by the upper end of the intermediate portion 36 so that the lowermost record of a stack of records resting on the step 49 can be moved so that its central opening is moved out of alignment with the upper portion 35 and into alignment with the intermediate portion 36. The boss 44 is mounted on the rod 43 so that the rod 43 can be moved up slightly carrying the upper portion 35 of the spindle 21 from its position in Fig. 3 into its position in Fig. 4, increasing the vertical distance between the step 49 and the shoulder 50 to adapt the spindle for records of larger size which have somewhat greater thickness. When the intermediate portion 36 is rotated approximately 180° from its position in Fig. 3 into its position in Fig. 10, the upper end of the intermediate portion 36 is brought into alignment or into continuity with the upper portion 35 so that the three parts of the spindle are in alignment or in continuity so that records may be freely removed from the turntable or applied thereto. As will hereinafter be explained this condition of the spindle is controlled by the position of the lateral support 24 when that support is moved into its unloading position clear of the path to be taken by records to be removed from the turntable.

The boss 41 is provided with a circumferential groove 51 which receives one end of a bar 52. This end of the bar is provided with a slot 53, the edges of the slot extending into the groove 51 so as slidably to support this end of the bar 52. At its outer end the slot is enlarged as indicated at 54 for assembly of the bar with the boss 41. This end of the bar 52 carries a parallel web 55 which is located between the two arms 45 and 46. The bar 52 is actuated by manipulation of the lateral support 24. When the support 24 is located for supporting records of larger size (Fig. 1) the bar 52 has the position shown in Fig. 7 and in Fig. 4. In this position an upper projection 56 on the web 55 engages the arm 45 so that the upper portion 35 of the spindle 21 is elevated as shown in Fig. 4 to adapt the spindle for records of the larger size. When the lateral support 24 is adjusted into position for records of smaller size the bar 52 has the position shown in Figs. 9 and 3 and a lower projection 57 on the web 55 engages the lower arm 46 so that the upper portion 35 of the spindle 21 is held seated on the intermediate portion 36 adapting the spindle for the thickness of the smaller records. On its upper side adjacent the slot 53 the arm 52 carries a rack 58 which engages a pinion 59 integral with the boss 41. When the lateral support 24 is adjusted into its unloading or "manual" position the bar 52 is moved into its position shown in Figs. 8 and 10 and the rack 58 rotates the boss 41 and the intermediate section 36 of the spindle 21 into the position shown in Fig. 10, the spindle 21 being now continuous for the facile removal and application of records from and on the turntable. Return of the lateral support 24 to either of its operating positions rotates the intermediate section 36 so as to bring the step 49 into operating position as shown in Figs. 2, 3 and 4. The position of the intermediate section 36 and its step 49 is identical in both positions of the lateral support 24 for records of larger and smaller size. Owing to the different obliquity of the bar 52 in these two positions (Figs. 7 and 9) the projections 56 and 57 are brought into proper position for adjusting the upper section 35 for the size of records for which the lateral support 24 is set.

Figures 7, 8, 9, 10:
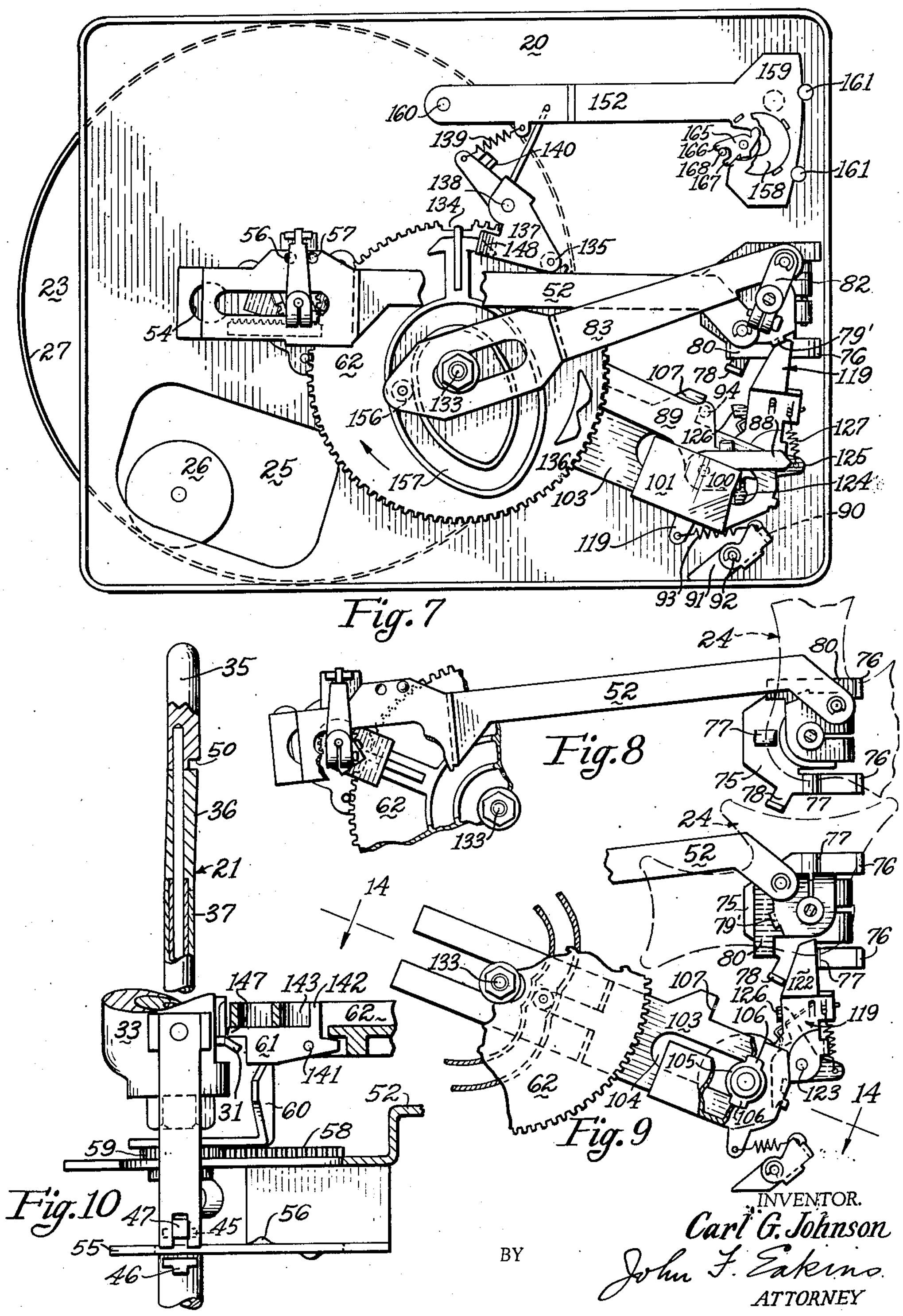
Fig. 7 is an inverted plan view of the phonograph.
Fig. 8 is a fragmentary inverted plan view showing the interconnecting elements associated with the lateral support and the spindle in position for rendering the spindle substantially continuous for record unloading or for manual operation of the phonograph.
Fig. 9 is an inverted plan view showing mechanism associated with the lateral support of the player arm in its condition when the record support is set for records of smaller size.
Fig. 10 is a fragmentary elevation, partly in section of the spindle and associated parts in unloading or manual position.

The boss 41 carries an upwardly directed arm 60 which rotates with it around the bracket 33. When the lateral support 24 is adjusted into the unloading or "manual" position the bar 52 is brought into the position shown in Fig. 8 to rotate the intermediate portion 36 into its position in Fig 10. This movement carries the arm 60 into position below a dog 61 carried by a cam gear 62 as shown in Fig. 10. This position of the arm 60 prevents descent of the dog 61 so that the cam gear is maintained out of operation and the machine can be operated manually as an ordinary non-automatic phonograph as will be understood from the subsequent description.

The lateral support 24 is suitably formed of flat stock and is of general L-shaped form providing a short arm 63 for supporting larger records and a longer arm 64 for supporting smaller records. The lateral support 24 is rigidly mounted on a vertical sleeve 65 which is rotatably mounted in a standard 66 mounted on the motor board 20 and located beyond the turntable on the other side of the spindle 21 from the normal position of the step 49. At its outer end each arm 63 and 64 is provided with a pair of upwardly displaced horns 67 so as to provide two spaced supports for a stack of records. A pair of ejector bars 68 and 69 extend outwardly towards the center of the ends of the arms 63 and 64 respectively. The outer ends of these bars may be guided in loops 70 and 71 stamped up from the stock of the lateral support 24. The inner ends of the bars 68 and 69 are pivotally connected to a crank pin 72 which extends upwardly from a crank disc 73. The crank disc is carried by a rod 74 which is rotatably mounted within the sleeve 65. In operation the effective bar 68 or 69, that is the bar which is directed towards the spindle, is retracted. During the record changing operation the rod 74 is oscillated so that the effective bar is projected in the manner shown for the bar 68 in Fig. 5 so that the lowermost record of the stack is displaced towards the spindle moving its central opening out of alignment with the upper portion 35 of the spindle 21 into alignment with the intermediate portion 36 of the spindle and moving the lowermost record clear of the supporting horns 67 so that the lowermost record is freed to drop on to the turntable. The bars 68 and 69 are located so that they can only engage the lowermost record of the stack. When the lowermost record of the stack is thus discharged the remaining records of the stack move downwardly so that the stack is again supported by the step 49 and the horns 67, the return movement of the rod 74 retracting effective bar 68 or 69.

The lower end of the standard 66 extends through the motor board 20 and at its lower end rigidly carries a stop member 75 which is of general horseshoe shape. The ends of this element are turned downwardly to provide stops 76. The member 75 is provided with three upwardly directed recesses 77 which are located 90° apart. The member 75 carries a projecting stop 78 the purpose of which will hereinafter be described. The sleeve 65 extends below the lower end of the standard 66 and has rigidly mounted thereon a member 79. The bar 52 is pivotally mounted to the under side of the member 79. The member 79 carries a T-shaped member 80 which is adapted to engage the stops 76 so as to limit the movement of the lateral support 24 to substantially 180°. The member 80 carries an upwardly directed V spring 81 which is adapted to enter any of the recesses 77 and resiliently hold the lateral support 24 in any of its three positions for records of either size and for unloading or manual operation. The lower web of the member 79 carries an up-turned abutment 79' which is in the same plane as the stop 78. The purpose of this abutment will hereinafter be described. The rod 74 extends below the sleeve 65 and at its lower end it rigidly carries an arm 82 to which is pivotally connected a link 83 which effects the oscillation of the crank disc 73.

The player arm 22 is pivotally mounted on an arm 85 which is rigidly carried by a sleeve 86. The sleeve 86 is rotatably mounted in a standard 87 carried by the motor board 20. A spring 84 connected to the player arm and to an arm carried by the arm 85 provides adjustment for the needle pressure. At its lower end the sleeve 86 rigidly carries two arms 88 and 89. The outer end of the arm 88 is tapered and normally tends to engage an up-turned detent 90 on a frame lever 91 which is pivotally mounted on a rod 92 depending from the motor board 20. The lever 91 is biassed by a spring 93 into its normal position which is defined by the engagement of one end of the lever against the flange of the motor board 20 as shown in Fig. 7. When the lever is in this position and the player arm is swung outwardly to its extreme position the tapered end of the arm 88 engages the detent 90 so that the player arm is latched out in this extreme position. Owing to the tapered end of the arm 88 the player arm may be moved inwardly again by slight force. The arm 89 carries an upwardly projecting pin 94 near its axis and its free end is of arcuate form as shown at 95 in Fig. 11. The outer edge of the arcuate portion 95 is provided with serrations 96. At its lower side the arcuate portion 95 of the arm 89 adjustably carries an abutment 97.

Figure 12:
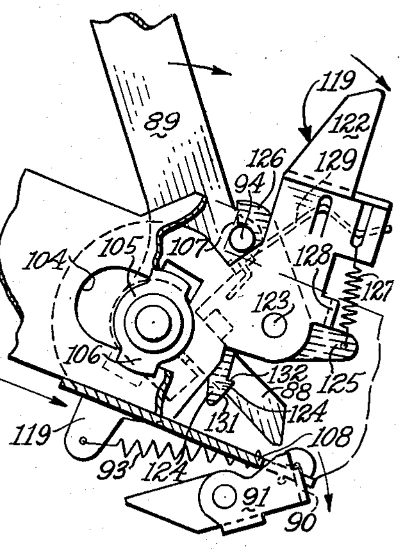
Fig. 12 is a similar view of part of the mechanism shown in Fig. 11 on a larger scale.
Figure 13:
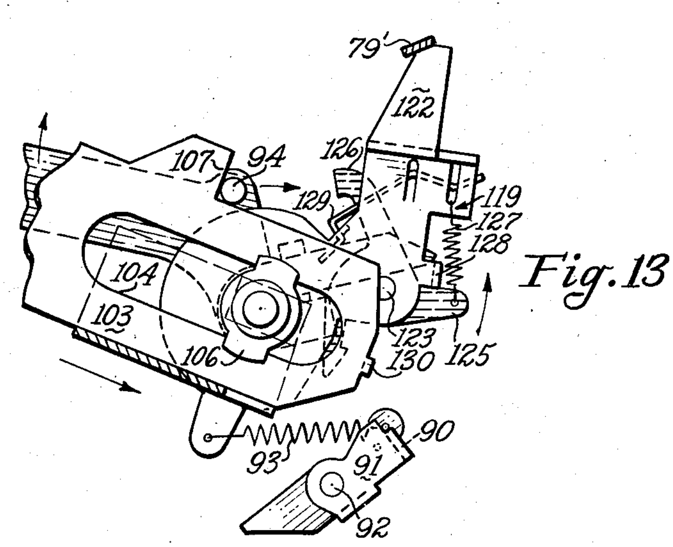
Fig. 13 is a view similar to Fig. 12 showing the manner in which the player arm is automatically carried outwardly.
Figure 14:
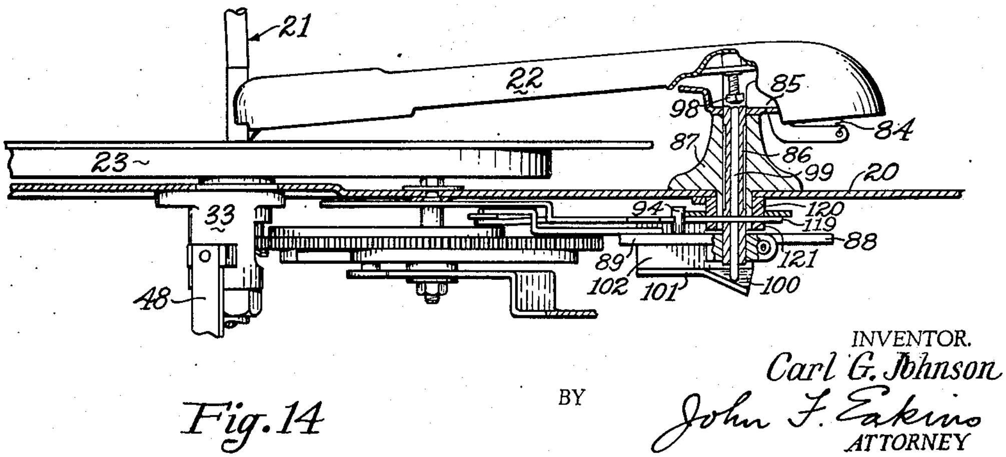
Fig. 14 is a sectional elevation of the phonograph showing particularly the player arm mounting and associated elements.

The player arm 22 carries an adjustable stop 98 which is arranged to be engaged by a rod 99 which slidably extends through the sleeve 86. The lower end of this rod rests on a cam surface 100 which is formed on a generally horizontal flange 101 carried by a depending web 102 which is integral with one end of a link 103. This end of the link is provided with a slot 104 which receives a collar 105 rigidly carried by the lower end of the standard 87 which projects through an opening in the motor board 20. Projections 106 on the collar 105 provide support for this end of the link 103. When the link 103 is moved outwardly its cam surface 100 elevates the rod 99 so that the player arm is elevated from the record and thereafter a shoulder 107 on the link 103 engages the pin 94 so as to swing the player arm outwardly into its extreme position. This occurs during automatic operation and a shoulder 108 on the web 102 of the link 103 engages the lever 91 so as to carry its detent 90 away from the arm 88 as shown in Fig. 12. Consequently the player arm is not latched in its outward position except when the machine is being used as a manual record player.

The cam disc 73 and the inner ends of the bars 68 and 69 are enclosed in a housing 109. A housing 110 carried on the housing 109 encloses a coil spring 111 which applies upward pressure on a flanged cylindrical seat 112. The seat 112 serves as the lower seat for a ball 113. The upper seat for the ball 113 is provided around an opening 114 at the apex of an outer housing 115. This housing is of general L-shaped form and its arms extend over the arms 68 and 69. The outer ends of the housing 115 are open and they are located clear of the records which are supported on the step 49 and the horns 67. An arm 116 is integral with the ball 113 which is provided with a semi-circumferential rib 117 which is engaged by the upper flange of the seat 112. The apex of the housing 115 is provided with slots 118 which extend across the opening 114 and are directed in the longitudinal direction of the two arms of the housing 115. These slots normally accommodate the arm 116 and this arm may be moved from one slot to the other by raising it against the compression of the spring 111 and turning around from one position to the other. The arm 116 is located relatively to the rib 117 so that when the arm is in either of the slots 118 the outer end of the arm is biassed towards a position below that of the lowermost record supported on the horns 67. Thus the arm 116 firmly seats the stack of records on the lateral support. When it is desired to apply a stack of records on the machine the arm 116 is swung upwardly and after the stack of records is properly seated on the step 49 and the horns 67, the arm 116 is released so that it applies its pressure on the topmost record on the stack.

The mechanism for moving the player arm inwardly into initial playing position for either size of records will now be described. This mechanism comprises a lever 119 which is pivotally mounted on the lower end of the standard 87 below the motor board by means of collars 120 and 121. One end of the lever 119 is connected to the spring 93 so that the other end of the lever is biassed towards the pin 94 which moves with the player arm. This end of the lever 119 comprises a lower end portion 122 which is arranged to be arrested by the stop 78 or by the abutment 79' when that abutment is located in cooperative relation by locating the lateral support for playing records of the larger size. The position of the abutment 79' in the twelve inch position is shown in Fig. 7. When the lateral support is in the ten inch position as shown in Fig. 9 the abutment 79' is removed out of the path of the end 122 of the lever 119 so that in this case the lever engages the stationary stop 78 after the spring 93 has swung the lever 119 through a greater distance. The pin 94 is caused to move a greater distance inwardly so that the needle is carried into initial playing position for a ten inch record.

On the upper side of the lever 119 I pivotally mount by means of a pivot 123 a lever having three arms 124, 125 and 126. The arm 125 is connected by a spring 127 to the lever 119 so that the three armed lever is biassed towards its position in Fig. 12 with the arm 125 engaging an up-turned lug 128 on the lever 119. The arm 126 is hooked so as to grasp lightly the pin 94 as this pin is being carried outwardly by the shoulder 107 in the manner shown in Fig. 12. Before being carried into engagement with the edge of the lever 119 the pin 94 engages a light spring 129 carried on the upper side of the lever 119. The purpose of this spring is to apply a slight pressure on the pin 94 and consequently on the player arm so that the needle is carried into the recording groove on the record when the pin 94 is released by the hooked arm 126. After compressing the light spring 129 the pin 94 engages the lever 119 and carries it to its outermost position tensioning the spring 93 to provide the energy for returning the player arm to its initial position with the hooked arm gripping the pin 94.

Figure 11:
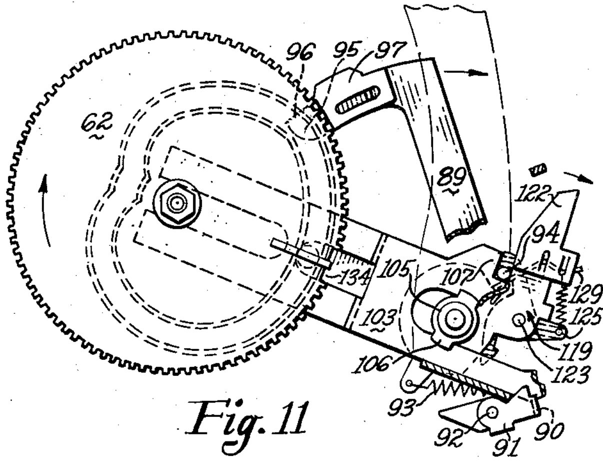
Fig. 11 is a fragmentary inverted plan view, partly in section of the mechanism showing the player arm manipulating mechanism holding the player arm in its outward position at an intermediate point of the record changing operation.

As will hereinafter be explained the link 103 moves outwardly, that is downwardly and to the right as viewed in Figs. 9 and 11 during the initial part of the record changing cycle. During the latter part of the record changing cycle the link 103 returns to its normal position and at the final stage of its return a detent 130 turned up at the end of the link 103 engages a curved surface 131 on the arm 124 so that the three armed lever is swung in the clockwise direction as viewed from below as shown in Fig. 9 swinging the arm 126 away from the pin 94. Before this occurs the lever 119 has carried the player arm into initial playing position determined by its engagement with the stop 78 or the abutment 79' depending upon the setting of the lateral support. Before the detent 130 engages the arm 124 the pin 99 has ridden down the cam 100 so that the needle is in engagement with the record to be played.

Consequently when the three armed lever is actuated by the detent 130 to disengage the pin 94 the weak spring 129 applies a slight push to the pin 94 so as to bring the needle into the recording groove.

When the machine is used as a manually operated record player the cam gear 62 is held out of operation and the link 103 is in its innermost position with its detent 130 bearing against the curved surface 131 of the arm 124. For manual playing the player arm is manually moved out to its outermost position. The three armed lever is consequently carried further bodily in the clockwise direction than is shown in Fig. 9 so that a shoulder 132 at the inner end of the curved surface 131 engages the detent 130. Since this shoulder is substantially at right angles to the line joining it to its pivot 123 the lever 119 is held inoperatively in its extreme position so that it has no effect on the player arm. This condition continues until the machine is again put into automatic operation whereupon the first outward movement of the link 103 disengages the detent 130 from the shoulder 132.

The cam gear 62 is mounted for free rotation on a stub axle 133 depending from the motor board. The gear is provided with peripheral teeth which mesh with the teeth 29 on the boss 28 of the turntable during the record changing cycle. These teeth are interrupted at 134 and this interruption is opposite the teeth 29 during the playing of a record so that the cam gear 62 is out of operation during reproduction. The cam gear is resiliently held in stationary position by means of a roller 135 which is biassed into a recess 136 on an abutment carried on the under side of the gear. The roller 135 is carried by a lever 137 pivotally mounted on a pin 138 depending from the motor board 20. The lever 137 is biassed into operating position by means of a spring 139. A stop 140 struck down from the motor board serves as an abutment for the lever 137. The dog 61 is mounted in radial direction by means of a pivot 141 (Fig. 10). The dog 61 is provided with an upwardly directed arm 142 which is arranged to be engaged by a latch 143 which is pivotally mounted at 144 on the upper side of the cam gear 62. The latch 143 is biassed towards latching position by a spring 145. The latch 143 has pivotally mounted thereon a dog 146 which is adapted to engage the serrations 96 on the arm 89 as that arm moves inwardly during reproduction. When the player arm is subjected to reverse movement due to the needle becoming located in an eccentric terminal groove, the dog 146 is actuated so as to swing the latch into unlatched position allowing the dog 61 to drop by gravity bringing a finger 147 on the dog into the path of one of the projections 31 which applies rotation to the gear 62 bringing its teeth into mesh with the teeth 29 on the boss 28 of the turntable. The cam gear 62 is thus driven through a complete revolution. During this revolution the under side of the dog is engaged by a cam formation 148 on the lever 137 so that the dog is again latched up. Consequently when the interruption 134 comes opposite the teeth 29 at the end of a single revolution the drive of the cam gear 62 is terminated until the dog 61 is again released. The abutment 97 on the arm 89 is arranged to engage a down-turned flange 149 on the latch 143 and to actuate the latch into unlatching position when the player arm is carried inwardly by a record having a spiral terminal groove. The latch 143 is provided with a depending flange 150 which is arranged to cooperate with a return bend on the end of a flexible rod 151. In the final stage of its single revolution the flange 150 displaces the end of the rod 151 and moves past it. The rod 151 is connected to a manually actuated control lever 152 and it is supported in an opening in a lug 153 depending from the motor board. Only its inner outwardly turned end is bent downwardly into the path of the flange 150. In the playing position the flange 150 is below the outturned end of the rod 51 as viewed in Fig. 1 and it will readily be apparent that downward movement of the lever 152 as viewed in this figure unlatches the latch 143 and initiates a record changing cycle. The inner end of the link 103, that is the end remote from the player arm mounting is forked and supported in a grooved collar on the axle 133 above the cam gear 62. The link 130 comprises a tongue 131' which carries on its under side a cam follower 154 which extends into a cam track 155 on the upper side of the cam gear 62. This cam truck is of general heart-shaped formation. During playing when the cam gear 62 is at rest the cam follower 154 is near the center of the cam. Initial and final movements of the cam gear 62 are accompanied by rapid outward and inward movement of the link 103 and during a large intermediate period of the rotation of the cam gear 62 the link 103 is held stationary in its outer position so that the player arm is held out until after the new record has been dropped.

The inner end of the link 83 is similarly mounted on the axle 133 below the cam gear 62. This link carries an upwardly extending cam follower 156 which extends upwardly into a cam track 157 on the under side of the cam gear 62. When the cam gear 62 is at rest the cam follower 156 is in its position nearest the center of the cam gear so that the link 83 is normally in its outermost position. The cam track 157 is also of general heart-shaped formation but it provides no rest moving the link 83 inwardly and then immediately outwardly. The effective bar 68 or 69 is consequently actuated to discharge a record while the player arm is in its outward position clear of the falling record.

The motor 25 is controlled by a switch 158 which is bodily carried on the under side of a plate 159 which is integral with the control lever 152. The lever 152 is pivotally mounted at 160 on the under side of the motor board and the plate 158 is slidably supported by grooved studs 161. The plate 159 carries a button 162 which extends through a slot 163 to the upper side of the motor board. Around this slot is mounted an escutcheon plate 164 which bears indicia indicating the position of the control lever. The switch 158 is provided with an actuating arm 165 which is provided with two horns 166 and 167 which cooperate with a stationary pin 168 depending from the motor board 20. The arm 165 is shown in the "on" position in Fig. 7 the horn 166 bearing against the pin 168. The spring 139 is connected to the control lever 152 at a very oblique angle so that this spring is unable to snap the switch to "off" position and consequently the switch holds the control lever 152 in the "on" position. In this position of the switch the lever 152 may be swung outwardly to "reject" position, the horn 167 of the switch arm 165 clearing the pin 168. This outward movement of the control lever moves the rod 151 downwardly as viewed in Fig. 1 tripping the latch 143 and initiating a record changing cycle so that a new record can be played without awaiting the complete rendition of a record. When the button 162 is released the spring 139 returns the control lever 152 to the "on" position with the horn 166 of the switch arm 165 abutting against the pin 168 as shown in Fig. 7. To stop the machine the button 162 is moved to its innermost position which moves the lever 152 bodily downward as viewed in Fig. 7. The stationary pin 168 consequently causes the switch arm 165 to rotate clockwise as viewed in this figure and the switch arm snaps into the "off" position with the horn 167 projecting behind the pin 168 ready to be actuated thereby on the next outward movement of the lever 152 to put the machine into operation again.

The operation is as follows. To play a stack of twelve-inch records the record support 24 is swung manually into its position in Fig. 1 and the arm 116 is directed inwardly towards the spindle 21 as shown in that figure. This position of the lateral support 24 locates the link 52 in its position in Fig. 7 so that the intermediate portion 36 of the spindle is located as shown in Fig. 4 providing the step 49 on the side of the spindle remote from the lateral support 24. This position of the link 52 brings the projection 56 into engagement with the upper arm 45 so that the upper section 35 of the spindle is elevated slightly so as to locate the shoulder 50 above the step 49 an amount suitable for the thickness of twelve-inch records. A stack of twelve-inch records is now applied to the upper section 35 of the post with this section extending through the central openings of the records. The stack is now brought into supported relation with the step 49 and the horns 67 of the arm 63 of the lateral support 24, the lever 116 being held up manually until after the records are thus located. This lever is now released so that it holds the stack firmly seated on the arm 63. The button 162 is now moved from the "off" position through the "play" or "on" position into the "reject" position thus starting the motor and tripping the latch 143 so that the cam gear 62 is driven through a complete revolution. When the machine is put out of operation the operator stops the motor and manually moves the player arm outwardly to its extreme position. Consequently the arm 88 is resiliently latched out by the lever 91 and the player arm return lever 119 is latched out by engagement of the detent 130 with the shoulder 132 on the three armed lever. The initial outward movement of the link 103 unlatches the three armed lever so that the hooked arm 126 grasps the pin 94. The initial movement of the link 103 also raises the player arm by means of its cam surface 100 and the player arm remains in its outward position, the lever 91 holding the player arm and the lever 119 latched out against the tension of the spring 93. The continuing outward movement of the link 103 brings the shoulder 107 into engagement with the pin 94 and brings the shoulder 108 into engagement with the lever 91 so that the lever 119 is freed to follow the pin 94 and the shoulder 107 inwardly during the return of the link 103. This inward movement of the lever 119 under the influence of the spring 93 continues until the lever 119 engages the abutment 79' which was located in its position in Fig. 7 by setting the lateral support 24 in the twelve inch position. The inward movement of the lever 119 is thus arrested when the player arm is in initial playing position for a twelve inch record. The player arm is now held in this position by the slight detent or hooking action of the arm 126 while the link 103 moves inwardly withdrawing the shoulder 107 out of the path of the pin 94. Towards the end of its inward movement the cam 100 allows the rod 99 to descend so that the player arm moves downwardly to bring the stylus into engagement with the record on the turntable and immediately thereafter the detent 130 engages the curved surface 131 of the arm 124 swinging the three armed lever in clockwise direction as viewed from below and withdrawing the arm 126 from the pin 94. The light spring 129 now becomes effective to apply a slight push to the pin 94 and to the player arm so that its needle is brought into the recording groove. During the rotation of the cam gear 62 the dog 61 is recocked by the cam surface 148 on the lever 137 and when the interruption 134 registers with the boss of the turntable the roller 135 enters the recess 136 and holds the cam gear 62 stationary during the rendition of the record.

At the end of the playing of the first record the arm 89 trips the latch 143 so that the dog 61 again descends and the cam gear 62 is caused to make another complete revolution to apply another record on to the turntable for reproduction. In this revolution the link 103 moves outwardly quite rapidly and the first action which it effects is to raise the player arm from the record by means of its cam 100. The shoulder 107 then engages the pin 94 so that the player arm is moved outwardly. The lever 119 is in abutting relation with the abutment 79′ and the outward movement of the pin 94 brings this pin into latched engagement with the hooked arm 126. The spring 129 is moved outwardly and the pin 94 engages the lever 119 so as to swing it outwardly. The shoulder 108 engages the lever 91 so as to maintain it unlatched until the arm 88 clears this lever as the player arm begins its inward movement. The lever 91 is only effective to latch out the player arm when the player arm is moved outward manually when the shoulder 108 is out of engagement with the lever 91. The return movement of the link 103 effects the application of the needle to the record in exactly the same manner as has just been described in connection with the first record. The cycle continues until all the records have been dropped and reproduced whereupon the machine is stopped manually by moving the button 162 upwardly as viewed in Fig. 1.

During each rotation of the cam gear the link 83 is actuated by the cam track 157 so that the crank disc 73 is oscillated so that the rejector bar 68 is actuated so as to discharge the lowermost record of the stack off the step 49 and the horns 67 of the arm 63. As has been previously described the cam tracks 155 and 157 are correlated so that the record is dropped while the player arm is being held out in its outermost position.

After the machine is stopped and the player arm is manually moved outwardly into latched condition the record support is rotated in the counterclockwise direction as viewed in Fig. 1 through an angle of 180°. This brings the record support clear of the path of the records to be lifted off the turntable and it also locates the link 52 in its position in Fig. 8 rotating the intermediate section 36 of the spindle 21 into its position in Fig. 10 so that the stack of records on the turntable may be removed by lifting them up, the spindle 21 being now continuous.

To play a stack of ten-inch records the record support 24 is located so that its longer arm 64 is directed towards the spindle 21. In this position of the record support 24 the abutment 79′ is moved out of the path of the lever 119 so that during the record changing cycle the arm 119 engages the stop 78 so that the player arm is carried into initial playing position for ten-inch records. The ten inch position of the record support 24 locates the link 52 in its positions in Figs. 9 and 3 locating the step 49 on the side of the spindle remote from the record support 24 and bringing the projection 57 on the link 52 into engagement with the lower arm 46 so that the upper portion 35 of the spindle is seated on the intermediate section 36 and the shoulder 50 is located above the seat 49 by a distance suitable for the thickness of ten-inch records. With the exception of the fact that the lever 119 cooperates with the stop 78 instead of the abutment 79′, to locate the player arm at initial playing position for a ten inch record, the operation is identical with the described operation for playing twelve-inch records.

For manual operation the lateral support 24 is moved into the discharge position and consequently the spindle 21 is rendered continuous as in Fig. 10 so that a single record may now be applied to and removed from the turntable in the manner of a non-automatic phonograph. The arm 60 is located below the dog 61 as shown in Fig. 10 so that the cam gear 62 is kept out of operation. The operator carries the player arm into its outermost position and the player arm is latched out yieldably by the engagement of the lever 91 with the tapered arm 88. This latching is permitted because the shoulder 108 on the link 103 is in its innermost position. The outward movement of the player arm swings the lever 119 in clockwise direction as viewed from below and bodily swings the three armed lever so that its shoulder 132 engages the detent 130, this detent being located in operative relation to the arm 124 also due to the inward position of the link 103. Consequently the lever 119 is prevented from actuating the player arm and this condition continues until the link 103 is moved outwardly again on the next automatic record changing cycle. It will therefore be understood that the player arm is free for manual operation in the usual manner of non-automatic phonographs and the machine can be put into operation as an ordinary phonograph by merely moving the button 162 into the "play" position.

Although the invention has been described in connection with the specific details of a preferred embodiment thereof, it must be understood that such details are not intended to be limitative of the invention except in so far as set forth in the accompanying claims.

Having thus described my invention I declare that what I claim is:

1. In an automatic phonograph, a record supporting spindle comprising an upper section, a lower section and an intermediate section, the lower section being in the form of a sleeve, a sleeve rotatably mounted in the lower section rigidly secured to the intermediate section, a rod extending through the last mentioned sleeve and through the intermediate section and rigidly supporting the upper section, said intermediate section being rotatable into one position to locate it in substantial continuity with both the upper and lower sections and into another position in which it is in substantial continuity with the lower section and out of continuity with the upper section so as to provide a record supporting step at its upper end, a shoulder on the upper section at a higher level than the step to permit the lowermost of a stack of records supported on said step with the upper section extending through their central openings, to be displaced out of alignment with the upper section and into alignment with the intermediate section and clear of the step, means at the lower end of the spindle for rotating the second mentioned sleeve to move the intermediate section from one position to the other, means at the lower end of the spindle for holding said rod against rotation, and means at the lower end of the spindle for displacing said rod in the vertical direction to locate the shoulder at different levels above the step to adapt the spindle for cooperation with records of different thickness.

2. In an automatic phonograph, in combination, a turntable, a record supporting spindle extending upwardly from the center of the turntable comprising an upper section, a lower section and an intermediate section, the lower section being in the form of a sleeve, a sleeve rotatably mounted in the lower section rigidly secured to the intermediate section, a rod extending through the last mentioned sleeve and through the intermediate section and rigidly supporting the upper section, means for holding said rod and upper section against rotation, said intermediate section being rotatable into one position to locate it in substantial continuity with both the upper and lower sections and into another position to locate it in substantial continuity with the lower section and out of continuity with the upper section so as to provide a record supporting step at its upper end, a lateral support arranged to cooperate with said step to support a stack of records above the turntable, said lateral support being movable into inoperative position clear of the records, and means operatively connecting the lateral support to the second mentioned sleeve to locate the intermediate section in its first mentioned position when the lateral support is in its inoperative position and to locate the intermediate section in its second mentioned position when the lateral support is in its stack supporting position, a shoulder on the upper section at a higher level than the step to permit the lowermost of the stack of records supported on said step with the upper section extending through their central openings, to be displaced out of alignment with the upper section and into alignment with the intermediate section and clear of the step.

3. In an automatic phonograph, in combination, a turntable, a record supporting spindle extending upwardly from the center of the turntable comprising an upper section, a lower section and an intermediate section, the lower section being in the form of a sleeve, a sleeve mounted in the lower section rigidly secured to the intermediate section, a rod extending through the last mentioned sleeve and through the intermediate section and rigidly supporting the upper section, means for holding said rod and upper section against rotation, said intermediate section being rotatable into one position to locate it in substantial continuity with both the upper and lower sections and into another position to locate it in substantial continuity with the lower section and out of continuity with the upper section so as to provide a record supporting step at its upper end, a lateral support arranged in one position to cooperate with said step to support a stack of records of a certain size above the turntable, arranged in another position to cooperate with said step to support a stack of records of another size above the turntable, and arranged in another position to be clear of the record stacks position, and means operatively connecting the lateral support to the second mentioned sleeve to locate the intermediate section in its second mentioned position when the lateral support is in either its first or second mentioned positions and to locate the intermediate section in its first mentioned position when the lateral support is in its third mentioned position.

4. In an automatic phonograph, in combination, a turntable, a record supporting spindle extending upwardly from the center of the turntable comprising an upper section, a lower section and an intermediate section, the lower section being in the form of a sleeve, a sleeve mounted in the lower section rigidly secured to the intermediate section, a rod extending through the last mentioned sleeve and through the intermediate section and rigidly supporting the upper section, means for holding said rod and upper section against rotation, said intermediate section being rotatable into one position to locate it in substantial continuity with both the upper and lower sections and into another position to locate it in substantial continuity with the lower section and out of continuity with the upper section so as to provide a record supporting step at its upper end, a lateral support arranged in one position to cooperate with said step to support a stack of records of a certain size above the turntable, arranged in another position to cooperate with said step to support a stack of records of another size above the turntable, and arranged in another position to be clear of the record stack position, means operatively connecting the lateral support to the second mentioned sleeve to locate the intermediate section in its second mentioned position when the lateral support is in either its first or second mentioned positions and to locate the intermediate section in its first mentioned position when the lateral support is in its third mentioned position, a shoulder on the upper section at a higher level than the step to permit the lowermost of the stack of records supported on said step and said lateral support to be displaced out of alignment with the upper section and into alignment with the intermediate section and clear of the step, and means operatively connecting said lateral support to said rod to effect vertical displacement of the rod, last said means being arranged in either the first two mentioned positions of the lateral support to locate said shoulder for cooperation with records of the thickness for which the lateral support is set.

CARL G. JOHNSON.

REFERENCES CITED

The following references are of record in the file of this patent:

UNITED STATES PATENTS

| Number | Name | Date |
|---|---|---|
| 2,293,212 | Offen | Aug. 18, 1942 |
| 2,328,703 | Becwar | Sept. 7, 1943 |
| 2,355,790 | Faulkner | Aug. 15, 1944 |
| 2,371,362 | Small | Mar. 13, 1945 |
| 2,374,080 | Dale | Apr. 17, 1945 |
| 2,394,539 | Erwood et al. | Feb. 12, 1946 |